(12) United States Patent
Kushwaha et al.

(10) Patent No.: US 10,091,235 B1
(45) Date of Patent: Oct. 2, 2018

(54) METHOD, SYSTEM, AND APPARATUS FOR DETECTING AND PREVENTING TARGETED ATTACKS

(71) Applicant: Juniper Networks, Inc., Sunnyvale, CA (US)

(72) Inventors: Deepak Kushwaha, Bangalore (IN); Mohit Joshi, Bangalore (IN); Puneet Tutliani, Bangalore (IN)

(73) Assignee: Juniper Networks, Inc., Sunnyvale, CA (US)

( * ) Notice: Subject to any disclaimer, the term of this patent is extended or adjusted under 35 U.S.C. 154(b) by 186 days.

(21) Appl. No.: 15/175,568

(22) Filed: Jun. 7, 2016

(51) Int. Cl.
*H04L 29/06* (2006.01)
*H04L 12/58* (2006.01)

(52) U.S. Cl.
CPC ............ *H04L 63/145* (2013.01); *H04L 51/08* (2013.01); *H04L 51/12* (2013.01)

(58) Field of Classification Search
CPC .............................. H04L 63/145; H04L 51/08
See application file for complete search history.

(56) References Cited

U.S. PATENT DOCUMENTS

| | | | | |
|---|---|---|---|---|
| 9,769,126 | B2 * | 9/2017 | Lapidous | ............ H04L 63/0428 |
| 9,942,250 | B2 * | 4/2018 | Stiansen | ............. H04L 63/1416 |
| 2001/0034849 | A1 * | 10/2001 | Powers | ................ G06Q 10/107 726/30 |
| 2004/0205133 | A1 * | 10/2004 | Adler | ................... G06Q 10/107 709/206 |
| 2005/0203855 | A1 * | 9/2005 | Malcolm | ............... G06F 21/606 705/64 |
| 2006/0229058 | A1 * | 10/2006 | Rosenberg | .............. H04W 4/02 455/404.2 |
| 2008/0147554 | A1 * | 6/2008 | Stevens | ............... G06F 21/6254 705/51 |
| 2008/0177994 | A1 * | 7/2008 | Mayer | ................... G06F 9/4418 713/2 |
| 2009/0254572 | A1 * | 10/2009 | Redlich | .................. G06Q 10/06 |
| 2012/0089845 | A1 * | 4/2012 | Raleigh | ................... H04L 12/14 713/176 |
| 2013/0204689 | A1 * | 8/2013 | Schulz | ............... G06Q 30/0225 705/14.26 |
| 2013/0333038 | A1 * | 12/2013 | Chien | ................. H04L 63/1408 726/23 |

(Continued)

*Primary Examiner* — Ali Shayanfar
(74) *Attorney, Agent, or Firm* — FisherBroyles, LLP

(57) ABSTRACT

The disclosed computer-implemented method may include (1) detecting a request from a computing device of a member of an organization in connection with a communication session between the computing device and at least one additional computing device, (2) identifying, within the request, a URL that the computing device is attempting to access, (3) computing a unique identifier that represents the URL, (4) comparing the unique identifier against a database that includes unique identifiers that represent URLs embedded in emails received by members of the organization, (5) determining, based at least in part on the comparison, that the URL was included in an email received by the member of the organization, and then in response, (6) elevating a threat level of the communication session between the computing device and the additional computing device. Various other methods, systems, and apparatuses are also disclosed.

18 Claims, 7 Drawing Sheets

(56) References Cited

U.S. PATENT DOCUMENTS

| | | | |
|---|---|---|---|
| 2014/0258032 A1* | 9/2014 | Psota | G06Q 30/02 705/26.35 |
| 2015/0229609 A1* | 8/2015 | Chien | H04L 63/101 726/13 |
| 2015/0237068 A1* | 8/2015 | Sandke | H04L 63/1466 726/23 |
| 2015/0381515 A1* | 12/2015 | Mattson | H04L 41/145 707/609 |
| 2016/0044054 A1* | 2/2016 | Stiansen | H04L 63/1416 726/24 |
| 2016/0044182 A1* | 2/2016 | Leemet | H04M 15/43 455/406 |
| 2016/0218921 A1* | 7/2016 | Christensen | H04L 63/0823 |
| 2016/0224680 A1* | 8/2016 | Maynard, II | G06F 17/30011 |
| 2017/0134957 A1* | 5/2017 | Gupta | H04W 12/12 |

* cited by examiner

METHOD, SYSTEM, AND APPARATUS FOR DETECTING AND PREVENTING TARGETED ATTACKS

BACKGROUND

Targeted attacks are often directed at organizations by way of spear-phishing emails. In this context, the term "targeted attack" typically refers to any type or form of computer-based attack and/or campaign that is specifically targeting one or more organizations. For example, a criminal hacker may send an email to an employee of a company with the intent of obtaining certain confidential and/or private information. In this example, the email may disguise and/or portray the criminal hacker as a friend, colleague, and/or business associate of the employee and/or the company.

Unfortunately, the employee may be unable to determine that the email is a scam. As a result, the employee may click on a link and/or open a file included in the email, thereby enabling the criminal hacker to gain access to the employee's computer. By gaining access to the employee's computer, the criminal hacker may collect confidential and/or private information, such as credit card numbers, bank account numbers, passwords, identification information, and/or financial information. In this way, the criminal hacker may be able to successfully infiltrate the company and/or carry out his or her targeted attack without the company's computer security detecting any suspicious and/or malicious activity.

The instant disclosure, therefore, identifies and addresses additional and improved methods, systems, and apparatuses for detecting and preventing targeted attacks.

SUMMARY

As will be described in greater detail below, the instant disclosure generally relates to methods, systems, and apparatuses for detecting and preventing targeted attacks. In one example, a method for accomplishing such a task may include (1) detecting a request from a computing device of a member of an organization in connection with a communication session between the computing device of the member of the organization and at least one additional computing device, (2) identifying, within the request, a Uniform Resource Locator (URL) that the computing device of the member of the organization is attempting to access, (3) computing a unique identifier that represents the URL identified within the request, (4) comparing the unique identifier that represents the URL against a database that includes unique identifiers that represent URLs embedded in emails received by members of the organization, (5) determining, based at least in part on the comparison, that the URL identified within the request was included in an email received by the member of the organization, and then in response to determining that the URL was included in an email received by the member of the organization, (6) elevating a threat level of the communication session between the computing device of the member of the organization and the additional computing device.

Similarly, a system for implementing the above-described method may include (1) a detection module, stored in memory, that detects a request from a computing device of a member of an organization in connection with a communication session between the computing device of the member of the organization and at least one additional computing device, (2) an identification module, stored in memory, that identifies, within the request, a URL that the computing device of the member of the organization is attempting to access, (3) a computation module, stored in memory, that computes a unique identifier that represents the URL identified within the request, (4) a determination module, stored in memory, that (A) compares the unique identifier that represents the URL against a database that includes unique identifiers that represent URLs embedded in emails received by members of the organization and (B) determines, based at least in part on the comparison, that the URL identified within the request was included in an email received by the member of the organization, (5) a security module, stored in memory, that elevates, in response to the determination that the URL was included in an email received by the member of the organization, a threat level of the communication session between the computing device of the member of the organization and the additional computing device, and (6) at least one physical processor configured to execute the detection module, the identification module, the computation module, the determination module, and the security module.

An apparatus for implementing the above-described method may include (1) a storage device that stores a database that includes unique identifiers that represent URLs embedded in emails received by members of an organization and (2) a physical processing unit communicatively coupled to the storage device, wherein the physical processing unit (A) detects a request from a computing device of a member of an organization in connection with a communication session between the computing device of the member of the organization and at least one additional computing device, (B) identifies, within the request, a URL that the computing device of the member of the organization is attempting to access, (C) computes a unique identifier that represents the URL identified within the request, (D) compares the unique identifier that represents the URL against a database that includes unique identifiers that represent URLs embedded in emails received by members of the organization, (E) determines, based at least in part on the comparison, that the URL identified within the request was included in an email received by the member of the organization and then (F) elevates, in response to determining that the URL was included in an email received by the member of the organization, a threat level of the communication session between the computing device of the member of the organization and the additional computing device.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
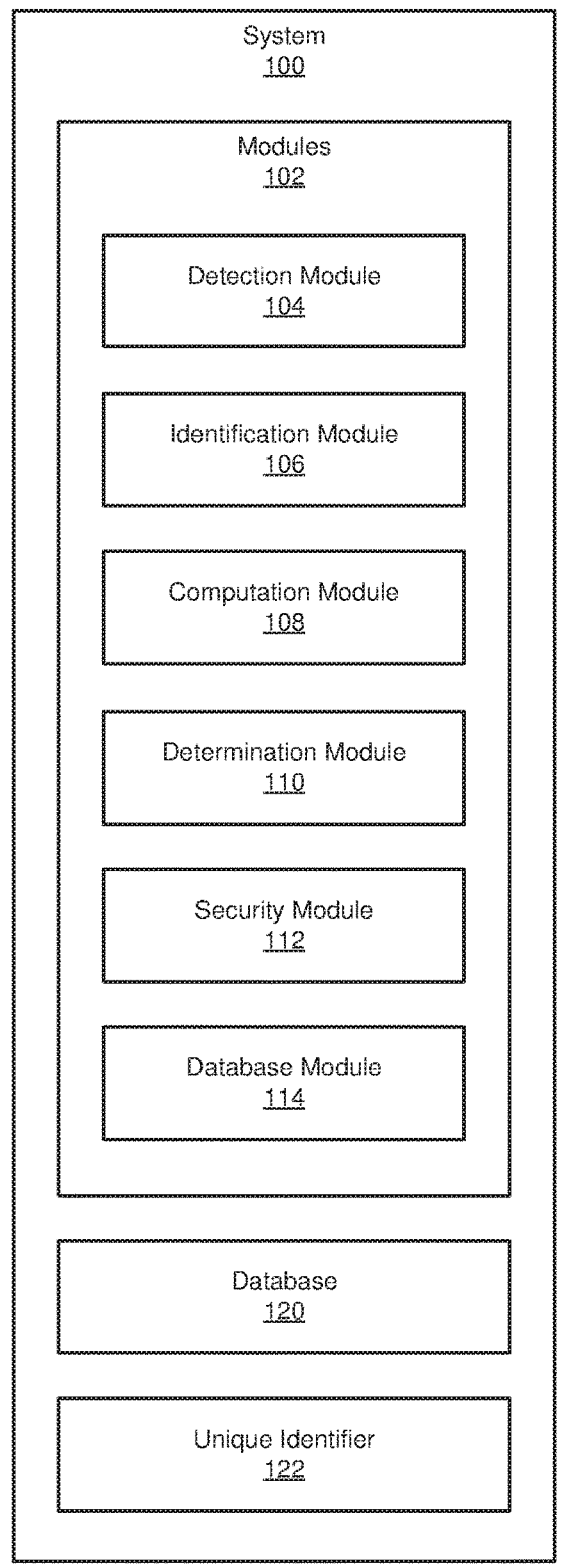
FIG. 1 is a block diagram of an exemplary system for detecting and preventing targeted attacks.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The present disclosure describes various methods, systems, and apparatuses for detecting and preventing targeted attacks. The term "targeted attack," as used herein, generally refers to any type or form of computer-based attack and/or campaign that is specifically targeting one or more organizations, as opposed to an attack (such as indiscriminate malware) that happens to target one entity or another without discrimination. As will be described in greater detail below, the various embodiments described herein may correlate spear-phishing emails with communication sessions that involve incoming and/or outgoing network traffic. By making such correlations, these embodiments may be able to identify which communication sessions spawned from spear-phishing emails and then classify those communication sessions as high risk and/or potentially dangerous.

Moreover, these embodiments may selectively perform Layer 7 Deep Packet Inspection (DPI) on those communication sessions that spawned from spear-phishing emails. Conversely, these embodiments may selectively refuse to perform Layer 7 DPI on those communication sessions that did not spawned from spear-phishing emails. In doing so, these embodiments may improve resource consumption and efficiency by refusing to apply Layer 7 DPI on communication sessions that pose little risk to an organization and/or its network.

Figure 2:
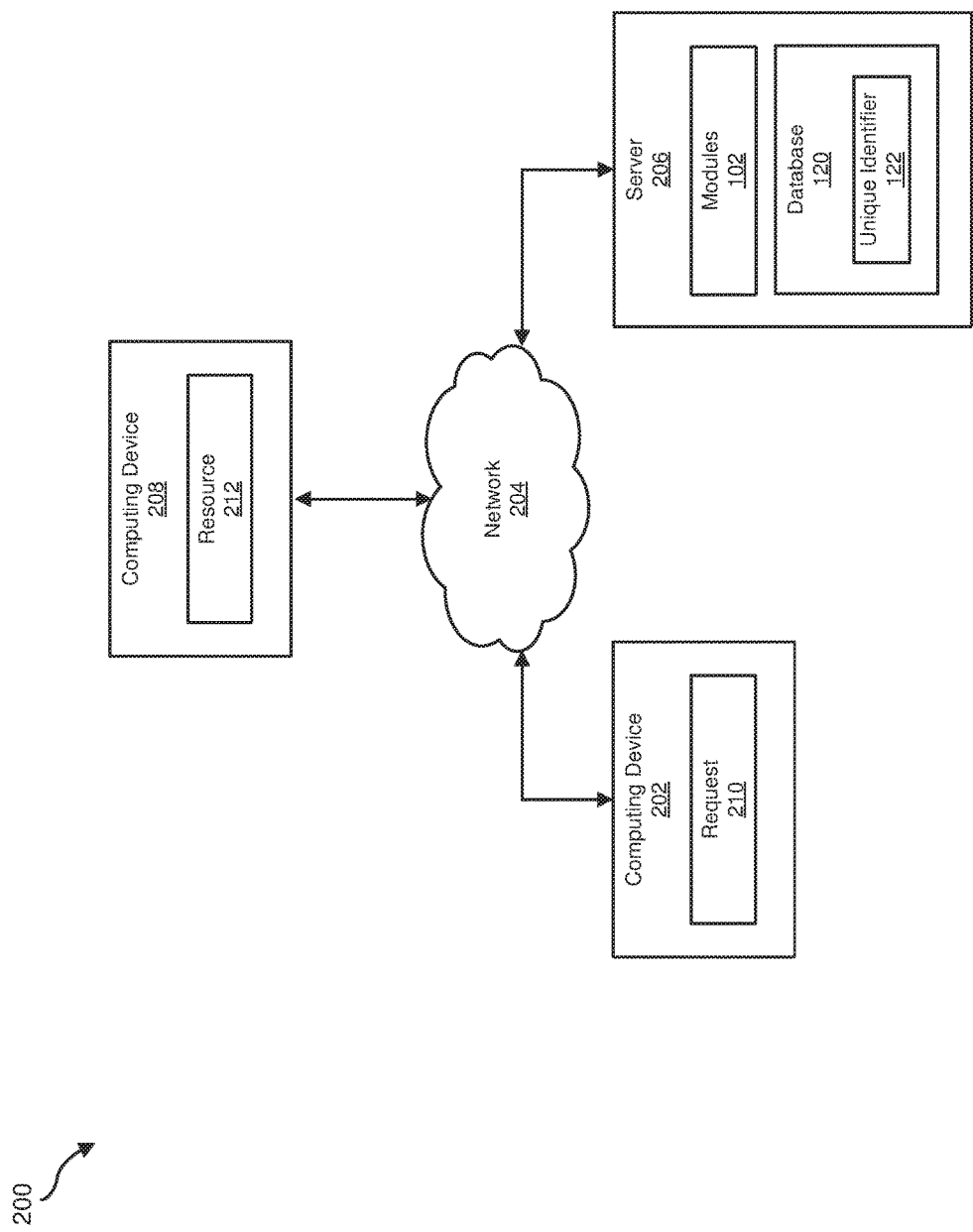
FIG. 2 is a block diagram of an additional exemplary system for detecting and preventing targeted attacks.

The following will provide, with reference to FIGS. 1 and 2, detailed descriptions of exemplary systems for detecting and preventing targeted attacks. Detailed descriptions of corresponding computer-implemented methods will be provided in connection with FIG. 3. Detailed descriptions of an exemplary database in connection with FIG. 4. Detailed descriptions of exemplary requests and hashes of URLs in connection with FIGS. 5 and 6. In addition, detailed descriptions of an exemplary computing system capable of implementing one or more of the embodiments described herein will be provided in connection with FIG. 7.

FIG. 1 is a block diagram of an exemplary system 100 for detecting and preventing targeted attacks. As illustrated in this figure, exemplary system 100 may include one or more modules 102 for performing one or more tasks. For example, and as will be explained in greater detail below, exemplary system 100 may include a detection module 104 that detects a request from a computing device of a member of an organization in connection with a communication session between the computing device of the member of the organization and at least one additional computing device. Exemplary system 100 may also include an identification module 106 that identifies, within the request, a URL that the computing device of the member of the organization is attempting to access.

In addition, exemplary system 100 may include a computation module 108 that computes a unique identifier that represents the URL identified within the request. Exemplary system 100 may further include a determination module 110 that (1) compares the unique identifier that represents the URL against a database that includes unique identifiers that represent URLs embedded in emails received by members of the organization and (2) determines, based at least in part on the comparison, that the URL identified within the request was included in an email received by the member of the organization.

Moreover, exemplary system 100 may include a security module 112 that elevates, in response to the determination, a threat level of the communication session between the computing device of the member of the organization and the additional computing device. Finally, exemplary system 100 may include a database module 114 that stores, within the database, a unique identifier that represents a URL identified within an email received by the member of the organization. Although illustrated as separate elements, one or more of modules 102 in FIG. 1 may represent portions of a single module or a single application (such as a network operating system, a network security system, and/or a client security system).

In certain embodiments, one or more of modules 102 in FIG. 1 may represent one or more software applications or programs that, when executed by a computing device, cause the computing device to perform one or more tasks. For example, and as will be described in greater detail below, one or more of modules 102 may represent software modules stored and configured to run on one or more computing devices, such as any of the devices illustrated in FIG. 2 (e.g., computing device 202, computing device 208, and/or server 206) and/or computing system 700 in FIG. 7. One or more of modules 102 in FIG. 1 may also represent all or portions of one or more special-purpose computers configured to perform one or more tasks.

As illustrated in FIG. 1, system 100 may also include one or more databases, such as database 120. In some examples, database 120 may include various information extracted from emails received by members of an organization. For example, database 120 may include unique identifiers (such as hashes) that represent URLs embedded in emails received by members of the organization. Additionally or alternatively, database 120 may include information that identifies computing devices that host the URLs embedded in the emails, the computing devices of members of the organization that are attempting to access the URLs, the names of the members of the organization whose computing devices are attempting to access the URLs, and/or results of Layer 7 DPI performed on the communication session.

As illustrated in FIG. 1, system 100 may further include one or more unique identifiers, such as unique identifier 122. In some examples, unique identifier 122 may uniquely identify a URL embedded in an email received by one or more members of the organization. Examples of unique identifier 122 include, without limitation, hashes, fingerprints, checksums, MD5 checksums, secure hash algorithms, digital signatures, references, pointers, combinations or variations of one or more of the same, and/or any other suitable unique identifier.

Exemplary system 100 in FIG. 1 may be implemented in a variety of ways. For example, all or a portion of exemplary system 100 may represent portions of exemplary system 200 in FIG. 2. As shown in FIG. 2, system 200 may include computing device 202, computing device 208, and/or server 206 in communication with one another via network 204. Although FIG. 2 illustrates computing devices 202 and 208 and server 206 as being external to network 204, one or more of computing devices 202 and 208 and server 206 may alternatively represent part of and/or be included in network 204.

In one example, server 206 may be programmed with one or more of modules 102. In this example, server 206 may include database 120 with unique identifiers that represent URLs embedded in emails received by members of the organization.

In one example, although not illustrated in this way in FIG. 2, computing device 202 may be programmed with one or more of modules 102. In this example, computing device 202 may generate and/or issue a request 210 that includes a URL that facilitates access to a resource 212 hosted by computing device 208.

In one example, although not illustrated in this way in FIG. 2, computing device 208 may be programmed with one or more of modules 102. In this example, computing device 208 may host resource 212 that is referenced by the URL included in request 210.

In one example, one or more of modules 102 from FIG. 1 may, when executed by at least one processor of server 206, enable server 206 to detect and prevent targeted attacks. For example, and as will be described in greater detail below, one or more of modules 102 may cause server 206 to (1) detect request 210 that originated from computing device 202 in connection with a communication session between computing device 202 and computing device 208 via network 204, (2) identify, within request 210, a URL that computing device 202 is attempting to access, (3) compute a unique identifier that represents the URL identified within request 210, (4) compare the unique identifier that represents the URL against database 120, (5) determine, based at least in part on this comparison, that the URL identified within request 210 was included in an email received by a member of an organization who is operating computing device 202, and then in response to determining that the URL was included in an email received by the member of the organization, (6) elevate a threat level of the communication session between computing device 202 and computing device 208.

Computing device 202 and 208 each generally represent any type or form of computing system, device, and/or mechanism that facilitates communication and/or data transfer within a network and/or across networks. In one example, computing device 202 may belong to and/or be operated by a member of an organization. In this example, computing device 208 may host resource 212, which is accessible via a URL. Examples of computing devices 202 and 208 include, without limitation, laptops, tablets, desktops, servers, cellular phones, Personal Digital Assistants (PDAs), multimedia players, embedded systems, wearable devices (e.g., smart watches, smart glasses, etc.), gaming consoles, combinations or variations of one or more of the same, exemplary computing system 710 in FIG. 7, and/or any other suitable computing devices.

Server 206 generally represents any type or form of computing device capable of monitoring, intercepting, inspecting, analyzing, and/or classifying network traffic. Examples of server 206 include, without limitation, security servers, application servers, web servers, storage servers, database servers, routers, switches, hubs, modems, bridges, repeaters, gateways, multiplexers, network adapters, network racks, chasses, servers, computing devices, client devices, portions of one or more of the same, combinations or variations of one or more of the same, and/or any other suitable server.

Network 204 generally represents any type or form of medium and/or architecture that facilitates communication or data transfer. In one example, network 204 may represent an IP version 4 (IPv4) or IP version 6 (IPv6) network. Examples of network 204 include, without limitation, an IPv6 network, an IPv4 network, an intranet, a Wide Area Network (WAN), a Local Area Network (LAN), a Personal Area Network (PAN), the Internet, a Power Line Communications (PLC) network, a cellular network (e.g., a Global System for Mobile Communications (GSM) network), portions of one or more of the same, combinations or variations of one or more of the same, and/or any other suitable network. Network 204 may facilitate communication and/or data transfer using wireless and/or wired connections.

Figure 3:
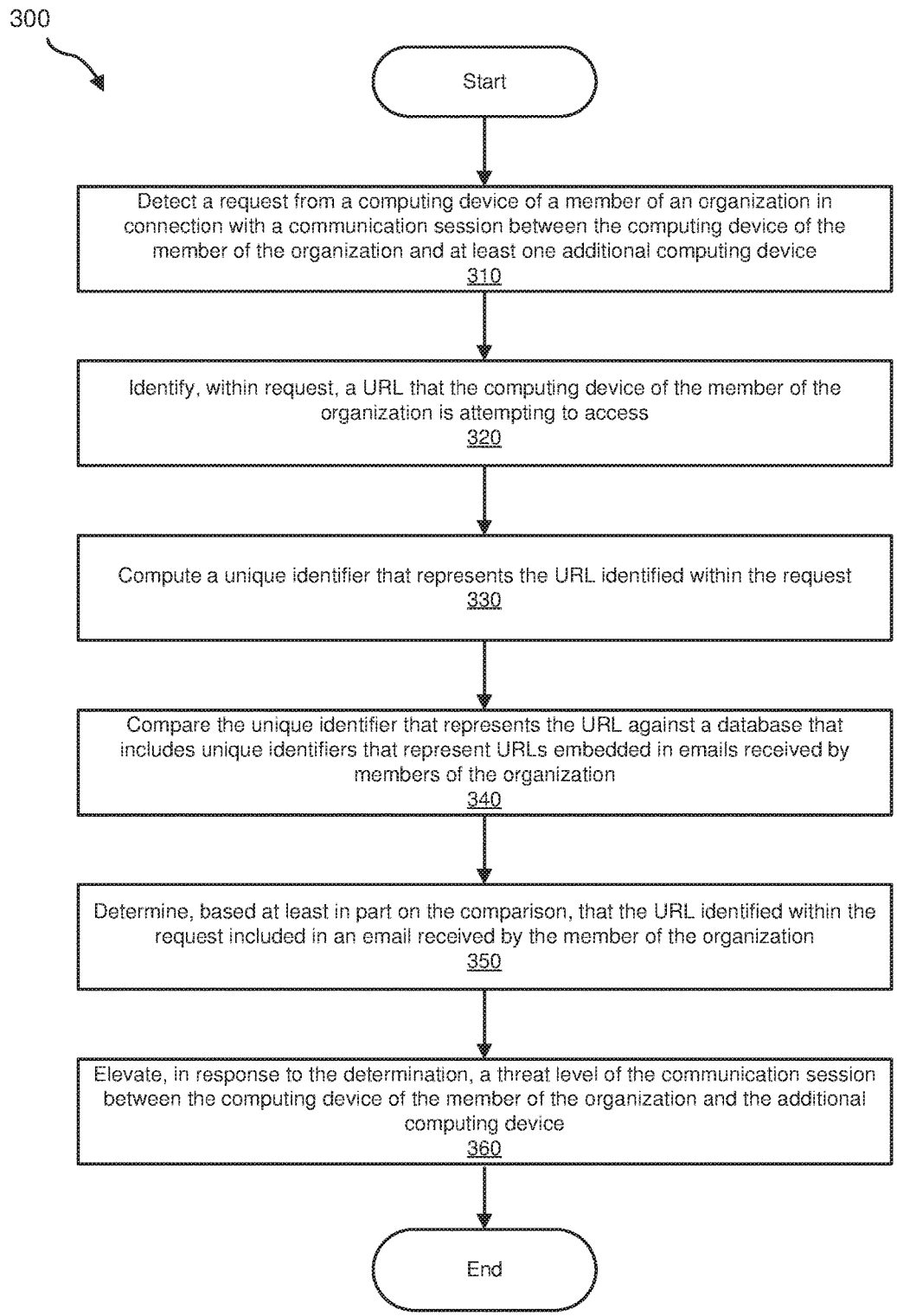
FIG. 3 is a flow diagram of an exemplary method for detecting and preventing targeted attacks.

FIG. 3 is a flow diagram of an exemplary computer-implemented method 300 for detecting and preventing targeted attacks. The steps shown in FIG. 3 may be performed by any suitable computer-executable code and/or computing system. In some embodiments, the steps shown in FIG. 3 may be performed by one or more of the components of system 100 in FIG. 1, system 200 in FIG. 2, and/or computing system 700 in FIG. 7.

As illustrated in FIG. 3, at step 310 one or more of the systems described herein may detect a request from a computing device of a member of an organization in connection with a communication session between the computing device of the member of the organization and at least one additional computing device. For example, detection module 104 may, as part of server 206, detect request 210 from computing device 202 in connection with a communication session between computing device 202 and computing device 208 via network 204. In this example, request 210 may include and/or represent a HyperText Transfer Protocol (HTTP) request generated and/or issued by computing device 202.

In one example, computing device 202 may be used and/or operated by a member of an organization. Examples of such an organization include, without limitation, corporations, government entities, military entities, businesses, security customer bases, schools, colleges, universities, institutions, associations, groups, collectives, think tanks, portions of one or more of the same, combinations or variations of one or more of the same, and/or any other suitable organization.

The term "communication session," as used herein, generally refers to any type or form of interchange, exchange, conversation, dialogue, meeting, and/or instance of communication between computing devices. In one example, the communication session may include and/or represent an HTTP session between computing devices. In this example, the HTTP session may include and/or involve one or more messages exchanged in each direction between these computing devices.

The systems described herein may perform step 310 in a variety of ways and/or contexts. In some examples, detection module 104 may detect request 210 while monitoring traffic within network 204. For example, detection module 104 may monitor traffic traversing network 204. While monitoring traffic traversing network 204, detection module 104 may intercept and/or detect request 210. In this example, request 210 may have originated from computing device 202 and/or be destined for computing device 208.

In one example, detection module 104 may detect request 210 as request 210 arrives at server 206. For example, computing device 202 may generate and/or issue request 210 and then send request 210 to computing device 208 via network 204. While traversing network 204, request 210 may arrive at server 206 on the way to computing device 208. As request 210 arrives at server 206, detection module 104 may intercept and/or detect request 210.

Returning to FIG. 3, at step 320 one or more of the systems described herein may identify, within the request, a URL that the computing device of the member of the organization is attempting access. For example, identification module 106 may, as part of server 206, identify a URL within request 210. In this example, the URL may identify and/or facilitate access to resource 212 hosted by computing device 208. In other words, the URL may define a computing path to resource 212 on computing device 208. Examples of resource 212 include, without limitation, files, websites, scripts, objects, data, portions of one or more the same, combinations or variations of one or more of the same, and/or any other suitable resource.

The systems described herein may perform step 320 in a variety of ways and/or contexts. In some examples, identification module 106 may identify the URL by searching through request 210. For example, identification module 106 may search request 210 for any references that identify and/or specify a location of a remote resource. While searching request 210 in this way, identification module 106 may identify a URL that identifies and/or specifies the storage location of resource 212 on computing device 208.

Figure 5:
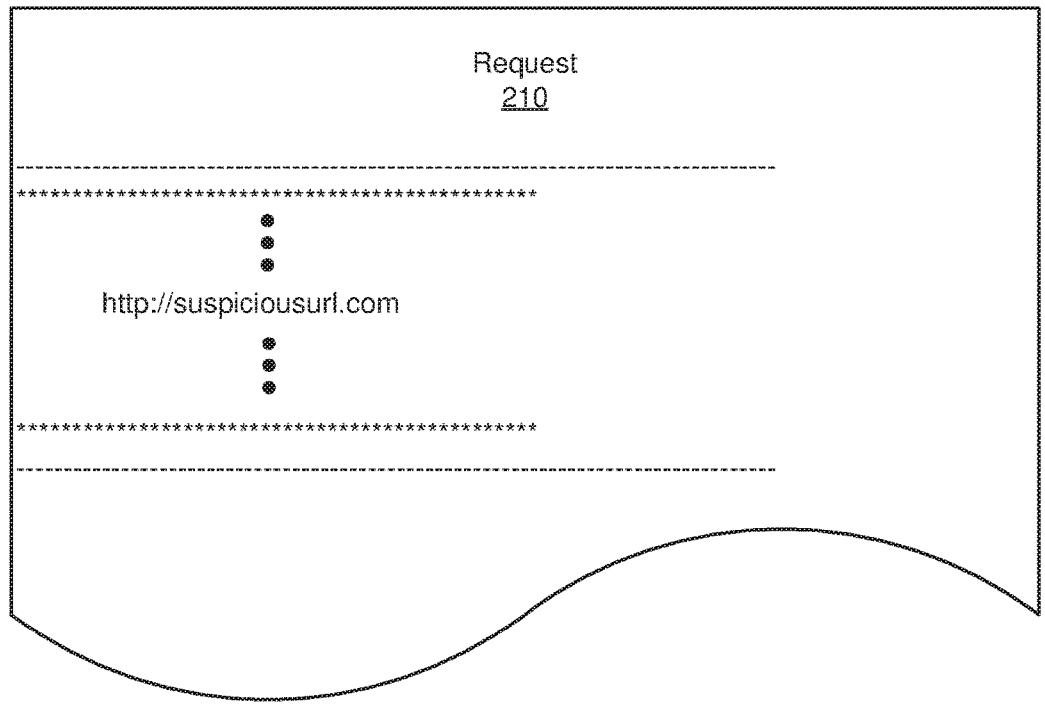
FIG. 5 is an illustration of an exemplary request that includes a URL and an exemplary hash of the URL.
Figure 5:
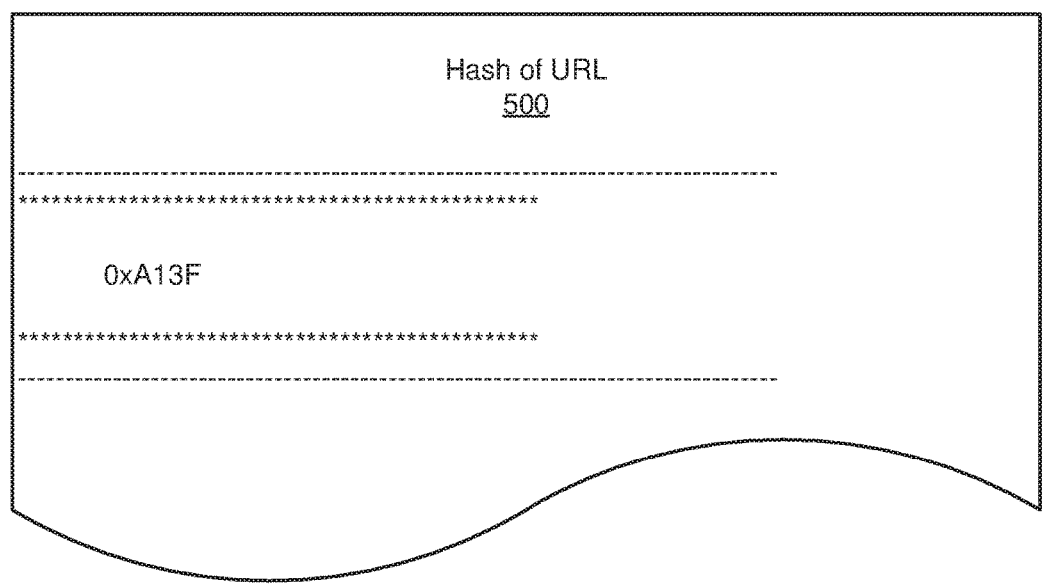

As a specific example, identification module 106 may identify a URL within request 210 in FIG. 5. As illustrated in FIG. 5, request 210 may represent an HTTP request that includes a URL (in this example, "http://suspiciousurl.com"). In one example, the URL may be located at a request line within request 210.

Figure 6:
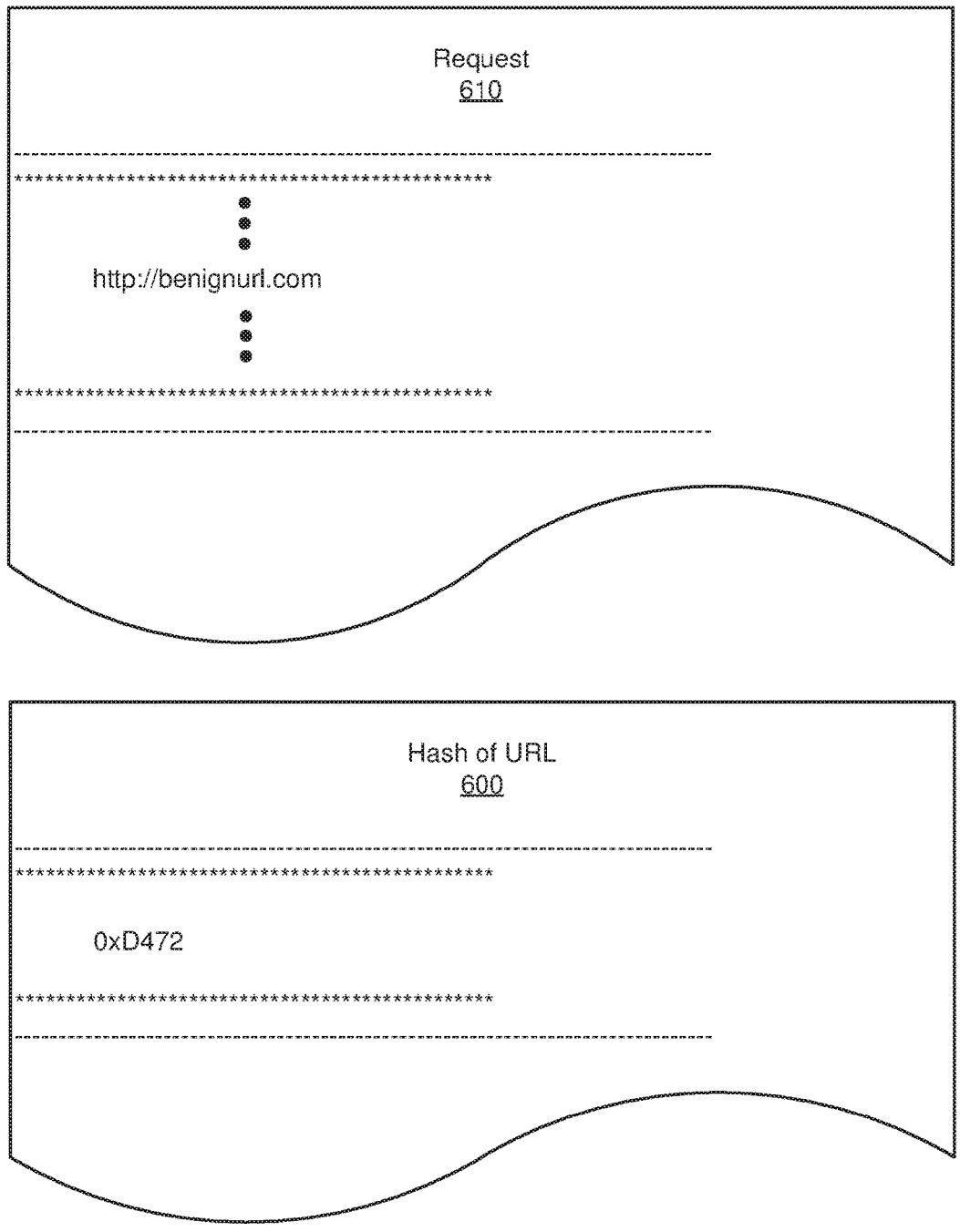
FIG. 6 is an additional illustration of an exemplary request that includes a URL and an exemplary hash of the URL.

As another specific example, identification module 106 may identify a URL within request 610 in FIG. 6. As illustrated in FIG. 6, request 610 may represent an HTTP request that includes a URL (in this example, "http://benignurl.com"). In one example, the URL may be located at a request line within request 610.

Returning to FIG. 3, at step 330 one or more of the systems described herein may compute a unique identifier that represents the URL identified within the request. For example, computation module 108 may, as part of server 206, compute unique identifier 122 that represents the URL identified in request 210. In this example, unique identifier 122 may include and/or represent a hash computed from the URL.

The systems described herein may perform step 330 in a variety of ways and/or contexts. In some examples, computation module 108 may compute unique identifier 122 by applying a hash function to the URL. The term "hash function," as used herein, generally refers to any process and/or algorithm that transforms data of an arbitrary size into data of a fixed size. In one example, a hash function may produce a unique output for each unique input. Examples of such a hash function include, without limitation, Berkeley Software Distribution (BSD) checksums, SYSV checksums, BLAKE-256 hash functions, MD2 hash functions, Pearson hash functions, Jenkins hash functions, and/or any other type of hash function.

As a specific example, computation module 108 may compute a hash 500 in FIG. 5 of the URL identified within request 210 in FIG. 5. As illustrated in FIG. 5, hash 500 may include and/or represent an alphanumerical string, such as a binary or hexadecimal representation (in this example, "0xA13F"). In this example, hash 500 may correspond to and/or be uniquely associated with request 210.

As another specific example, computation module 108 may compute a hash 600 in FIG. 6 of the URL identified within request 610 in FIG. 6. As illustrated in FIG. 6, hash 600 may include and/or represent an alphanumerical string, such as a binary or hexadecimal representation (in this example, "0xD472"). In this example, hash 600 may correspond to and/or be uniquely associated with request 610.

Returning to FIG. 3, at step 340 one or more of the systems described herein may compare the unique identifier that represents the URL against a database that includes unique identifiers that represent URLs embedded in emails received by members of the organization. For example, determination module 110 may, as part of server 206, compare unique identifier 122 against database 120. In this example, database 120 may include various hashes of URLs that were previously identified in emails received by members of the organization.

The systems described herein may perform step 340 in a variety of ways and/or contexts. In some examples, determination module 110 may compare unique identifier 122 of the URL to database 120 by searching through database 120. For example, determination module 110 may search database 120 for a hash that matches unique identifier 122 that represents the URL identified within request 210. During the search, determination module 110 may identify unique identifier 122 that represents the URL identified within request 210 in database 120.

Figure 4:
FIG. 4 is an illustration of an exemplary database that includes hashes of URLs identified in email payloads.

As a specific example, determination module 110 may compare hash 500 with database 120 in FIG. 4. As illustrated in FIG. 4, database 120 may include various hashes (in this example, "0xA13F", "0x27D1", "0x03C8", "0x2309", "0x89BE", "0xFA36", and "0x3094") that were previously identified in email payloads received by members of the organization. For example, determination module 110 may search database 120 in FIG. 4 for the "A13F" hash.

As another specific example, determination module 110 may compare hash 600 with database 120 in FIG. 4. In this example, determination module 110 may search database 120 in FIG. 4 for the "0xD472" hash.

In some examples, database 120 may be populated with unique identifiers that represent URLs identified within emails received by the members of the organization. In one example, database module 114 may create and/or build database 120. In this example, identification module 106 may identify various emails received by some or all of the members of the organization. For example, identification module 106 may monitor the email accounts of the members of the organization. While monitoring the email accounts of the members of the organization, identification module 106 may dynamically identify emails as they arrive in the members' email accounts.

Upon identifying these emails, identification module 106 may scan the emails for any URLs. In one example, identification module 106 may scan the body of an email received by the member of the organization in search of any URLs. Additionally or alternatively, identification module 106 may scan an attachment of the email in search of any URLs. For example, identification module 106 may identify a file attached to the email. Examples of such a file include, without limitation, Portable Document Format (PDF) files, Microsoft Word documents, Object Linking and Embedding (OLE) files, compound files, JavaScript files, files that include JavaScript (e.g., a file that includes embedded JavaScript that automatically accesses a URL upon being opened), audio files, video files, combinations or variations of one or more of the same, and/or any other suitable file.

In one example, identification module 106 may include and/or represent a Layer 7 protocol and file parser that parses email payloads to identify embedded and/or hidden URLs. Additionally or alternatively, this Layer 7 protocol and file parser may parse any email attachments to identify embedded and/or hidden URLs (in, e.g., JavaScript). After identification module 106 has identified a URL, computation module 108 may compute a unique identifier (e.g., a hash) that represents the identified URL. Database module 114 may store the unique identifier that represents the identified URL within database 120. In other words, database module 114 may add an entry that includes the unique identifier to database 120.

By populating database 120 in this way, database module 114 may, in conjunction with determination module 110, facilitate correlating network traffic and/or communication sessions with emails received by members of the organization. For example, database module 114 and/or determination module 110 may collectively correlate a file downloaded to a computing device operated by a member of the organization with a spear-phishing email received by that member of the organization. This correlation may enable security module 112 to perform one or more security actions (e.g., a full DPI inspection, quarantine, and/or continued monitoring) on the file. In doing so, these modules may detect, prevent, and/or mitigate targeted attacks directed to the organization and/or its members.

Returning to FIG. 3, at step 350 one or more of the systems described herein may determine, based at least in part on the comparison, that the URL identified within the request was included in an email received by the member of the organization. For example, determination module 110 may, as part of server 206, determine that the URL identified within request 210 was included in an email received by the member of the organization. In this example, the email may have been received by the member of the organization prior to issuance of request 210.

The systems described herein may perform step 350 in a variety of ways and/or contexts. In some examples, determination module 110 may determine that the URL identified within request 210 was included in such an email due at least in part to the unique identifier of the URL being identified in database 120. In other words, since the unique identifier of the URL was found in database 120, determination module 110 may conclude that the URL was included in an email received by the member.

As a specific example, determination module 110 may determine that the "http://suspiciousurl.com" URL was included in an email received by the member because the "0xA13F" hash was found in database 120. In contrast, determination module 110 may determine that the "http://benignurl.com" URL was not included in any emails received by the member because the "0xD472" hash was not found in database 120.

Returning to FIG. 3, at step 360 one or more of the systems described herein may elevate a threat level of the communication session between the computing device of the member of the organization and the additional computing device. For example, security module 112 may elevate a threat level of the communication session between computing device 202 and computing device 208 in response to the determination that the URL was included in an email received by the member of the organization. In this example, the elevated threat level may indicate and/or suggest that the communication session involves potentially malicious activity. As a result, security module 112 may selectively perform Layer 7 DPI on the communication session due at least in part to the elevated threat level of the communication session.

The systems described herein may perform step 360 in a variety of ways and/or contexts. In some examples, security module 112 may elevate the threat level of the communication session by classifying the communication session as potentially malicious. In such examples, security module 112 may perform more invasive evaluations on the messages exchanged between computing device 202 and computing device 208 during the communication session. For example, security module 112 may perform Layer 7 DPI on all messages originating from computing device 202 and destined for computing device 208. Additionally or alternatively, security module 112 may perform Layer 7 DPI on all messages originating from computing device 208 and destined for computing device 202.

In some examples, security module 112 may determine that the URL identified within request 210 facilitates access to resource 212 on computing device 208. In one example, resource 212 may include and/or represent a file. In this example, security module 112 may determine that the URL facilitates a download of a file to computing device 202 from computing device 208. Examples of such a file include, without limitation, executables, audio files, video files, PDF files, document files, data files, batch files, archive files, media files, backup files, library files, compressed files, scripts, binary code, machine code, samples or portions of one or more of the same, combinations or variations of one or more of the same, and/or any other suitable file.

In one example, the file may be hosted by and/or stored on computing device 208. In this example, security module 112 may identify the downloaded file on computing device 202 and then inspect and/or quarantine the downloaded file to prevent, mitigate, and/or curtail malicious infection. Additionally or alternatively, security module 112 may intercept and/or interrupt the file download while in process to prevent, mitigate, and/or curtail malicious infection.

In one example, security module 112 may inspect, analyze, and/or scan the file for malware. Upon inspection, security module 112 may determine that the file includes malware. In response to this determination, security module 112 may quarantine the file. Additionally or alternatively, security module 112 may notify the member who initiated request 210 of the potential targeted attack. Security module 112 may also blacklist computing device 208 such that other computing devices within the organization's network are unable to communicate with computing device 208.

As a result of the elevated threat level of the communication session, security module 112 may add certain data, information, and/or records to database 120 in connection with the communication session. In one example, security module 112 may add a record that identifies the host of the resource corresponding to the URL, the computing device attempting to access the URL, the member of the organization whose computing device is attempting to access the URL, and/or the results of the Layer 7 DPI performed on the communication session. For example, one of these records may identify computing device 208 as the host of resource 212, computing device 202 as having attempted to access the URL, and/or "John Doe" as the member operating computing device 202. Additionally or alternatively, this record may indicate that the URL facilitates a file download that introduces malicious content into computing devices and/or the name of that file.

In some examples, security module 112 may selectively perform Layer 7 DPI only on communication sessions that spawned from URLs included in database 120. In other words, security module 112 may refuse to perform a Layer 7 DPI on a communication session that did not spawn from a URL included in an email received by a member of the organization. For example, detection module 104 may detect another request from computing device 202 or another computing device (not illustrated in FIG. 2) in connection with a communication session between that computing device and a further computing device (not illustrated in FIG. 2). In this example, identification module 106 may identify a URL within that other request. Computation module 108 may compute a unique identifier that represents the URL identified within that other request.

Continuing with this example, determination module 110 may compare the unique identifier that represents this URL against database 120. Determination module 110 may then determine that this URL was not included in any emails received by the member of the organization who is operating the computing device that initiated the other request. In response to this determination, security module 112 may enable the communication session between the computing device that initiated the other request and the further computing device to continue communicating with one another without elevating the threat level of that communication session. As a result, security module 112 may refuse to perform a Layer 7 DPI and/or sandboxing on the communication session due at least in part to the threat level of the communication session not having been elevated.

In other words, security module 112 may refuse to quarantine a file downloaded to the computing device via the URL identified within the other request. Additionally or alternatively, security module 112 may refuse to inspect the file for malware. By refusing to perform the Layer 7 DPI and/or sandboxing on computing sessions that pose little risk to the organization and/or its network in this way, security module 112 may be able to improve resource consumption and/or efficiency within the network. Accordingly, modules 102 may facilitate selective inspection of communications and thus improve performance and/or efficiency in view of the expensive and/or time-consuming process of Layer 7 DPI or sandboxing.

In some examples, high-risk communication sessions may represent and/or result from targeted attacks on the organization. The correlation between spear-phishing emails and subsequent network traffic may facilitate preventative security and/or forensics at a very early stage in such targeted attacks. Additionally or alternatively, database 120 may be shared across multiple organizations to enable all of these organizations to compare their network traffic against URLs found in emails received by members of these organizations. By sharing database 120 in this way, modules 102 may be able to detect, prevent, and/or mitigate cross-organization spear-phishing attacks that target multiple organizations.

Figure 7:
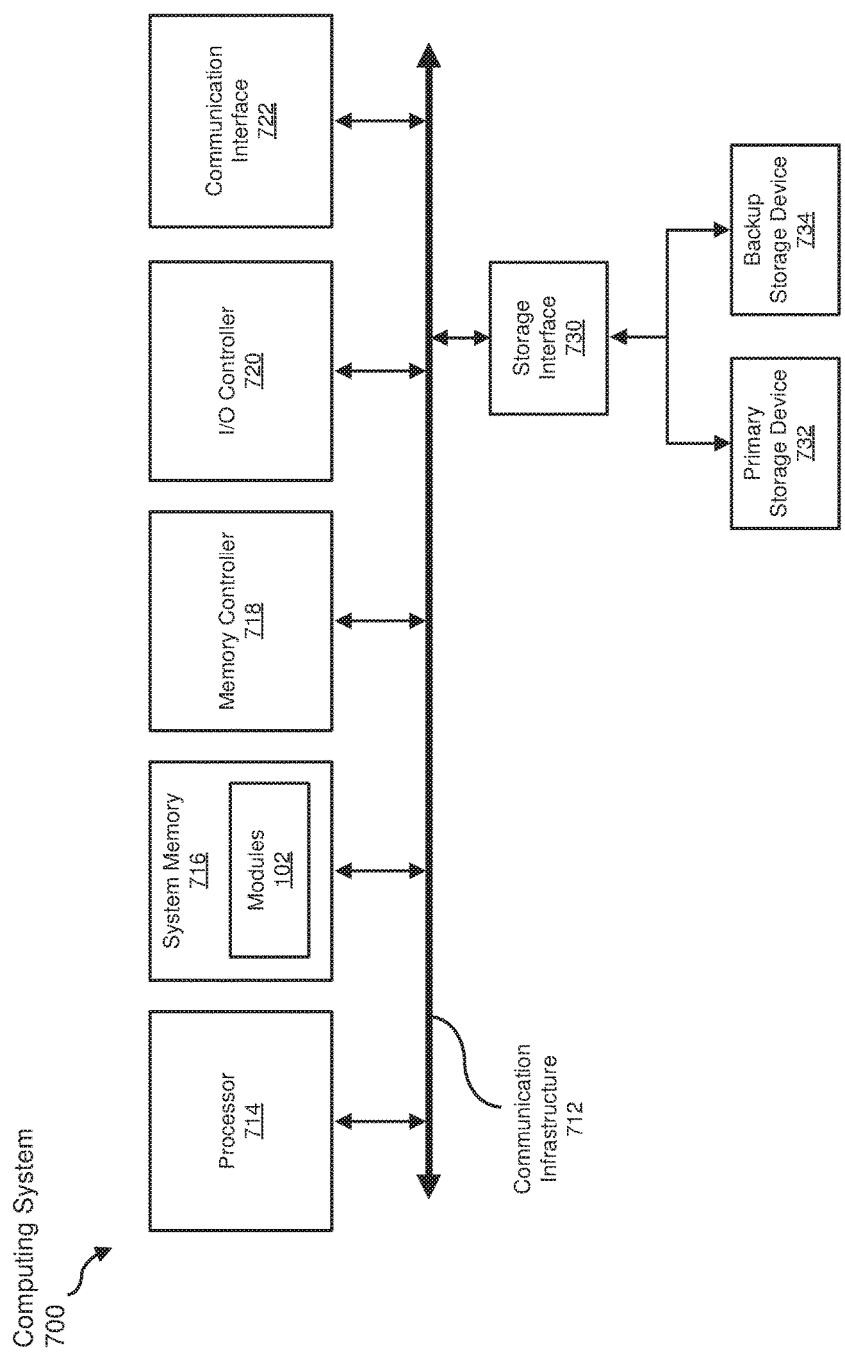
FIG. 7 is a block diagram of an exemplary computing system capable of implementing and/or being used in connection with one or more of the embodiments described and/or illustrated herein.

FIG. 7 is a block diagram of an exemplary computing system 700 capable of implementing and/or being used in connection with one or more of the embodiments described and/or illustrated herein. In some embodiments, all or a portion of computing system 700 may perform and/or be a means for performing, either alone or in combination with other elements, one or more of the steps described in connection with FIG. 3. All or a portion of computing system 700 may also perform and/or be a means for performing and/or implementing any other steps, methods, or processes described and/or illustrated herein. In one example, computing system 700 may include and/or represent an apparatus that performs and/or constitutes a means for performing and/or implementing any other steps, methods, or processes described and/or illustrated herein.

Computing system 700 broadly represents any type or form of electrical load, including a single or multi-processor computing device or system capable of executing computer-readable instructions. Examples of computing system 700 include, without limitation, workstations, laptops, client-side terminals, servers, distributed computing systems, mobile devices, network switches, network routers (e.g., backbone routers, edge routers, core routers, mobile service routers, broadband routers, etc.), network appliances (e.g., network security appliances, network control appliances, network timing appliances, SSL VPN (Secure Sockets Layer Virtual Private Network) appliances, etc.), network controllers, gateways (e.g., service gateways, mobile packet gateways, multi-access gateways, security gateways, etc.), and/or any other type or form of computing system or device.

Computing system 700 may be programmed, configured, and/or otherwise designed to comply with one or more networking protocols. According to certain embodiments, computing system 700 may be designed to work with protocols of one or more layers of the Open Systems Interconnection (OSI) reference model, such as a physical layer protocol, a link layer protocol, a network layer protocol, a transport layer protocol, a session layer protocol, a presentation layer protocol, and/or an application layer protocol. For example, computing system 700 may include a network device configured according to a Universal Serial Bus (USB) protocol, an Institute of Electrical and Electronics Engineers (IEEE) 1394 protocol, an Ethernet protocol, a T1 protocol, a Synchronous Optical Networking (SONET) protocol, a Synchronous Digital Hierarchy (SDH) protocol, an Integrated Services Digital Network (ISDN) protocol, an Asynchronous Transfer Mode (ATM) protocol, a Point-to-Point Protocol (PPP), a Point-to-Point Protocol over Ethernet (PPPoE), a Point-to-Point Protocol over ATM (PPPoA), a Bluetooth protocol, an IEEE 802.XX protocol, a frame relay protocol, a token ring protocol, a spanning tree protocol, and/or any other suitable protocol.

Computing system 700 may include various network and/or computing components. For example, computing system 700 may include at least one processor 714 and a system memory 716. Processor 714 generally represents any type or form of processing unit capable of processing data or interpreting and executing instructions. For example, processor 714 may represent an ASIC, a system on a chip (e.g., a network processor), a hardware accelerator, a general purpose processor, and/or any other suitable processing element.

Processor 714 may process data according to one or more of the networking protocols discussed above. For example, processor 714 may execute or implement a portion of a protocol stack, may process packets, may perform memory operations (e.g., queuing packets for later processing), may execute end-user applications, and/or may perform any other processing tasks.

System memory 716 generally represents any type or form of volatile or non-volatile storage device or medium capable of storing data and/or other computer-readable instructions. Examples of system memory 716 include, without limitation, Random Access Memory (RAM), Read Only Memory (ROM), flash memory, or any other suitable memory device. Although not required, in certain embodiments computing system 700 may include both a volatile memory unit (such as, for example, system memory 716) and a non-volatile storage device (such as, for example, primary storage device 732, as described in detail below). System memory 716 may be implemented as shared memory and/or distributed memory in a network device. Furthermore, system memory 716 may store packets and/or other information used in networking operations. In one example, system memory 616 may include and/or store one or more of modules 102 from FIG. 1.

In certain embodiments, exemplary computing system 700 may also include one or more components or elements in addition to processor 714 and system memory 716. For example, as illustrated in FIG. 7, computing system 700 may include a memory controller 718, an Input/Output (I/O) controller 720, and a communication interface 722, each of which may be interconnected via communication infrastructure 712. Communication infrastructure 712 generally represents any type or form of infrastructure capable of facilitating communication between one or more components of a computing device. Examples of communication infrastructure 712 include, without limitation, a communication bus (such as a Serial ATA (SATA), an Industry Standard Architecture (ISA), a Peripheral Component Interconnect (PCI), a PCI Express (PCIe), and/or any other suitable bus), and a network.

Memory controller 718 generally represents any type or form of device capable of handling memory or data or controlling communication between one or more components of computing system 700. For example, in certain embodiments memory controller 718 may control communication between processor 714, system memory 716, and I/O controller 720 via communication infrastructure 712. In some embodiments, memory controller 718 may include a Direct Memory Access (DMA) unit that may transfer data (e.g., packets) to or from a link adapter.

I/O controller 720 generally represents any type or form of device or module capable of coordinating and/or controlling the input and output functions of a computing device. For example, in certain embodiments I/O controller 720 may control or facilitate transfer of data between one or more elements of computing system 700, such as processor 714, system memory 716, communication interface 722, and storage interface 730.

Communication interface 722 broadly represents any type or form of communication device or adapter capable of facilitating communication between exemplary computing system 700 and one or more additional devices. For example, in certain embodiments communication interface 722 may facilitate communication between computing system 700 and a private or public network including additional computing systems. Examples of communication interface 722 include, without limitation, a link adapter, a wired network interface (such as a network interface card), a wireless network interface (such as a wireless network interface card), and any other suitable interface. In at least one embodiment, communication interface 722 may provide a direct connection to a remote server via a direct link to a network, such as the Internet. Communication interface 722 may also indirectly provide such a connection through, for example, a local area network (such as an Ethernet network), a personal area network, a wide area network, a private network (e.g., a virtual private network), a telephone or cable network, a cellular telephone connection, a satellite data connection, or any other suitable connection.

In certain embodiments, communication interface 722 may also represent a host adapter configured to facilitate communication between computing system 700 and one or more additional network or storage devices via an external bus or communications channel. Examples of host adapters include, without limitation, Small Computer System Interface (SCSI) host adapters, Universal Serial Bus (USB) host adapters, IEEE 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 722 may also enable computing system 700 to engage in distributed or remote computing. For example, communication interface 722 may receive instructions from a remote device or send instructions to a remote device for execution.

As illustrated in FIG. 7, exemplary computing system 700 may also include a primary storage device 732 and/or a backup storage device 734 coupled to communication infrastructure 712 via a storage interface 730. Storage devices 732 and 734 generally represent any type or form of storage device or medium capable of storing data and/or other computer-readable instructions. For example, storage devices 732 and 734 may represent a magnetic disk drive (e.g., a so-called hard drive), a solid state drive, a floppy disk drive, a magnetic tape drive, an optical disk drive, a flash drive, or the like. Storage interface 730 generally represents any type or form of interface or device for transferring data between storage devices 732 and 734 and other components of computing system 700.

In certain embodiments, storage devices 732 and 734 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 732 and 734 may also include other similar structures or devices for allowing computer software, data, or other computer-readable instructions to be loaded into computing system 700. For example, storage devices 732 and 734 may be configured to read and write software, data, or other computer-readable information. Storage devices 732 and 734 may be a part of computing system 700 or may be separate devices accessed through other interface systems.

Many other devices or subsystems may be connected to computing system 700. Conversely, all of the components and devices illustrated in FIG. 7 need not be present to practice the embodiments described and/or illustrated herein. The devices and subsystems referenced above may also be interconnected in different ways from those shown in FIG. 7. Computing system 700 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable medium. The term "computer-readable medium" generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives and floppy disks), optical-storage media (e.g., Compact Disks (CDs) and Digital Video Disks (DVDs)), electronic-storage media (e.g., solid-state drives and flash media), and other distribution systems.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

In some examples, all or a portion of system 100 in FIG. 1 may represent portions of a cloud-computing or network-based environment. Cloud-computing and network-based environments may provide various services and applications via the Internet. These cloud-computing and network-based services (e.g., software as a service, platform as a service, infrastructure as a service, etc.) may be accessible through a web browser or other remote interface. Various functions described herein may also provide network switching capabilities, gateway access capabilities, network security functions, content caching and delivery services for a network, network control services, and/or and other networking functionality.

In addition, one or more of the modules described herein may transform data, physical devices, and/or representations of physical devices from one form to another. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A method comprising:
    detecting a request from a computing device of a member of an organization in connection with a communication session between the computing device of the member of the organization and at least one additional computing device;
    identifying, within the request, a Uniform Resource Locator (URL) that the computing device of the member of the organization is attempting to access;
    computing a unique identifier that represents the URL identified within the request;
    comparing the unique identifier that represents the URL against a database that includes unique identifiers that represent URLs embedded in emails received by members of the organization;
    determining, based at least in part on the comparison, that the URL identified within the request was included in an email received by the member of the organization;
    in response to determining that the URL was included in an email received by the member of the organization, elevating a threat level of the communication session between the computing device of the member of the organization and the additional computing device; and
    in response to elevating the threat level of the communication session, selectively performing a Layer 7 Deep Packet Inspection (DPI) on the communication session.

2. The method of claim 1, wherein elevating the threat level of the communication session comprises:
    determining that the URL facilitates a download of a file to the computing device; and
    quarantining the file downloaded to the computing device.

3. The method of claim 2, wherein quarantining the file comprises:
    inspecting the file for malware;
    determining that the file includes malware; and
    in response to determining that the file includes malware, quarantining the file.

4. The method of claim 1, wherein elevating the threat level of the communication session comprises adding, to the database, a record that identifies at least one of:
    a host of a resource corresponding to the URL;
    the computing device attempting to access the URL;
    the member of the organization whose computing device is attempting to access the URL; and
    a result of a Layer 7 DPI performed on the communication session.

5. The method of claim 1, further comprising:
    identifying emails received by the member of the organization;
    identifying, within at least one of the emails, at least one payload that includes a URL;
    computing a unique identifier that represents the URL identified in the payload; and
    storing, within the database, the unique identifier that represents the URL identified in the payload.

6. The method of claim 5, wherein the payload comprises at least one of:
    an attachment of the email; and
    a body of the email.

7. The method of claim 1, wherein the communication session comprises a HyperText Transfer Protocol (HTTP) session.

8. The method of claim 1, further comprising:
    detecting another request from another computing device of another member of the organization in connection with another communication session between the other computing device of the other member of the organization and at least one further computing device;

identifying, within the other request, a URL that the other computing device of the other member of the organization is attempting to access;

computing a unique identifier that represents the other URL identified within the other request;

comparing the unique identifier that represents the other URL identified within the other request against the database that includes the unique identifiers that represent the URLs embedded in the emails received by the members of the organization;

determining, based at least in part on the comparison, that the other URL identified within the other request was not included in another email received by the other member of the organization; and in response to determining that the other URL was not included in the other email received by the other member of the organization, enabling the other communication session to continue without elevating a threat level of the other communication session.

9. The method of claim 8, wherein enabling the other communication session to continue without elevating the threat level of the other communication session comprises refusing to perform a Layer 7 DPI on the communication session due at least in part to the threat level of the communication session not having been elevated.

10. The method of claim 8, wherein enabling the other communication session to continue without elevating the threat level of the other communication session comprises at least one of:

refusing to quarantine a file downloaded to the computing device via the URL; and refusing to inspect the file for malware.

11. A system comprising:

a detection module, stored in memory, that detects a request from a computing device of a member of an organization in connection with a communication session between the computing device of the member of the organization and at least one additional computing device;

an identification module, stored in memory, that identifies, within the request, a Uniform Resource Locator (URL) that the computing device of the member of the organization is attempting to access;

a computation module, stored in memory, that computes a unique identifier that represents the URL identified within the request;

a determination module, stored in memory, that:
compares the unique identifier that represents the URL against a database that includes unique identifiers that represent URLs embedded in emails received by members of the organization;

determines, based at least in part on the comparison, that the URL identified within the request was included in an email received by the member of the organization;

a security module, stored in memory, that:
elevates, in response to the determination that the URL was included in an email received by the member of the organization, a threat level of the communication session between the computing device of the member of the organization and the additional computing device; and selectively performs, in response to elevating the threat level of the communication session, a Layer 7 Deep Packet Inspection (DPI) on the communication session; and at least one physical processor configured to execute the detection module, the identification module, the computation module, the determination module, and the security module.

12. The system of claim 11, wherein the security module:
determines that the URL facilitates a download of a file to the computing device; and
quarantines the file downloaded to the computing device.

13. The system of claim 12, wherein the security module: inspect the file for malware; and quarantine the file in response to a determination that the file includes malware.

14. The system of claim 11, further comprising a database module, stored in memory, that adds, to the database, a record that identifies at least one of:

a host of a resource corresponding to the URL;
the computing device attempting to access the URL;
the member of the organization whose computing device is attempting to access the URL; and
a result of a Layer 7 DPI performed on the communication session; and
the physical processor is further configured to execute the database module.

15. The system of claim 11, wherein:
the identification module:
identifies emails received by the member of the organization; and
identifies, within at least one of the emails, at least one payload that includes a URL;
the computation module computes a unique identifier that represents the URL identified in the payload; and
further comprising a database module, stored in memory, that stores, within the database, the unique identifier that represents the URL identified in the payload; and
the physical processor is further configured to execute the database module.

16. The system of claim 15, wherein the payload comprises at least one of:
an attachment of the email; and
a body of the email.

17. The system of claim 11, wherein the communication session comprises a HyperText Transfer Protocol (HTTP) session.

18. An apparatus comprising:
a storage device that stores a database that includes unique identifiers that represent Uniform Resource Locator (URLs) embedded in emails received by members of an organization; and
a physical processing unit communicatively coupled to the storage device, wherein the physical processing unit:
detects a request from a computing device of a member of an organization in connection with a communication session between the computing device of the member of the organization and at least one additional computing device;
identifies, within the request, a URL that the computing device of the member of the organization is attempting to access;
computes a unique identifier that represents the URL identified within the request;
compares the unique identifier that represents the URL against a database that includes unique identifiers that represent URLs embedded in emails received by members of the organization;

determines, based at least in part on the comparison, that the URL identified within the request was included in an email received by the member of the organization;

elevates, in response to determining that the URL was included in an email received by the member of the organization, a threat level of the communication session between the computing device of the member of the organization and the additional computing device; and selectively performs, in response to elevating the threat level of the communication session, a Layer 7 Deep Packet Inspection (DPI) on the communication session.

* * * * *